US006996543B1

(12) United States Patent
Coppersmith et al.

(10) Patent No.: US 6,996,543 B1
(45) Date of Patent: Feb. 7, 2006

(54) SYSTEM FOR PROTECTION OF GOODS AGAINST COUNTERFEITING

(75) Inventors: Don Coppersmith, Ossining, NY (US); Claude A. Greengard, Chappaqua, NY (US); Charles P. Tresser, Mamaroneck, NY (US); Chai Wah Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,279

(22) Filed: Oct. 29, 1998

Related U.S. Application Data

(63) Continuation-in-part of application No. 09/060,026, filed on Apr. 14, 1998, now Pat. No. 6,069,955.

(51) Int. Cl.
*G06F 17/60* (2006.01)
*H04L 9/32* (2006.01)
*G09C 5/00* (2006.01)
*B44F 1/12* (2006.01)
*B42D 15/00* (2006.01)

(52) U.S. Cl. ............................ 705/50; 705/28; 705/23; 235/385; 380/51; 380/55; 713/168; 283/70; 283/72; 283/74; 283/81

(58) Field of Classification Search ................ 711/115; 705/67, 26–27, 28, 50; 235/492, 380, 375, 235/385; 713/169, 173, 180, 176, 178, 168; 380/279, 54, 30, 46, 200, 202, 51, 55; 283/901; 382/232, 260, 270, 284; 340/5.8, 5.86; G06F 17/60; H04L 9/00

See application file for complete search history.

(56) References Cited

U.S. PATENT DOCUMENTS 4,463,250 A * 7/1984 McNeight et al. .......... 235/385

(Continued)

OTHER PUBLICATIONS

Fuji-Keiza USA, Inc. "Top 40 high tech companies in Europe . . . ", Jul. 1997.*

(Continued)

*Primary Examiner*—Cuong H Nguyen
(74) *Attorney, Agent, or Firm*—Whitham, Curtis & Christofferson, P.C.; Stephen C. Kaufman

(57) ABSTRACT

In order to verify the authenticity of manufactured goods, a smart tag is attached to the goods containing encrypted authentication information, such as a serial number, a description of the good's physical appearance or chemical decomposition, its color, or digital images of the good etc. The encryption procedure comprises public/private key encryption with zero-knowledge protocols. Zero knowledge protocols allow a smart tag to be authenticatable and yet be duplication resistant by allowing the verifying agent to convince him/herself that the smart tag is authentic without revealing its authentication information. The verification procedure can be done using a reader at a point of sale (POS) machine equipped with the appropriate public key and zero-knowledge protocols to decrypt the authentication information. A printed version of the serial number or other authentication information may be placed on the goods in human readable form to quickly verify the information electronically read from the smart tag. With the present invention, only the manufacturer can create such smart tags with the associated data thus making it virtually impossible to pass off a counterfeit good as authentic. In addition to authenticating counterfeit goods, the present invention can be used to detect authentic goods being sold in a parallel market.

16 Claims, 4 Drawing Sheets

U.S. PATENT DOCUMENTS

| | | | | | |
|---|---|---|---|---|---|
| 4,651,150 | A | * | 3/1987 | Katz et al. | 340/5.86 |
| 4,758,714 | A | * | 7/1988 | Carlson et al. | 705/1 |
| 4,785,290 | A | * | 11/1988 | Goldman | 380/51 |
| 4,816,824 | A | * | 3/1989 | Katz et al. | 340/5.86 |
| 4,864,110 | A | * | 9/1989 | Guillou | 235/380 |
| 4,995,082 | A | * | 2/1991 | Schnorr | 705/67 |
| 5,140,634 | A | * | 8/1992 | Guillou et al. | 705/67 |
| 5,164,988 | A | * | 11/1992 | Matyas et al. | 380/25 |
| 5,237,307 | A | * | 8/1993 | Gritton | 340/572.1 |
| 5,297,206 | A | * | 3/1994 | Orton | 380/30 |
| 5,303,370 | A | * | 4/1994 | Brosh et al. | 380/51 |
| 5,367,148 | A | * | 11/1994 | Storch et al. | 235/375 |
| 5,418,855 | A | * | 5/1995 | Liang et al. | 713/179 |
| 5,469,363 | A | * | 11/1995 | Saliga | 700/225 |
| 5,640,002 | A | * | 6/1997 | Ruppert et al. | |
| 5,673,318 | A | * | 9/1997 | Bellare et al. | 380/29 |
| 5,687,236 | A | * | 11/1997 | Moskowitz et al. | 380/28 |
| 5,721,781 | A | * | 2/1998 | Deo et al. | 705/67 |
| 5,740,250 | A | * | 4/1998 | Moh | 380/28 |
| 5,757,521 | A | * | 5/1998 | Walters et al. | 359/2 |
| 5,768,384 | A | * | 6/1998 | Berson | |
| 5,768,385 | A | * | 6/1998 | Simon | 705/69 |
| 5,774,876 | A | * | 6/1998 | Woolley et al. | |
| 5,790,677 | A | * | 8/1998 | Fox et al. | |
| 5,804,810 | A | * | 9/1998 | Woolley et al. | |
| 5,815,657 | A | * | 9/1998 | Williams et al. | 713/200 |
| 5,892,441 | A | * | 4/1999 | Woolley et al. | |
| 5,901,303 | A | * | 5/1999 | Chew | 711/115 |
| 5,963,133 | A | * | 10/1999 | Monjo | 340/572.1 |
| 5,971,435 | A | * | 10/1999 | DiCesare et al. | 283/70 |
| 5,973,731 | A | * | 10/1999 | Schwab | 348/161 |
| 5,974,150 | A | * | 10/1999 | Kaish et al. | 713/179 |
| 6,058,481 | A | * | 5/2000 | Kowalski | 713/201 |
| 6,069,955 | A | * | 5/2000 | Coppersmith et al. | |
| 6,078,888 | A | * | 6/2000 | Johnson, Jr. | |
| 6,097,292 | A | * | 8/2000 | Kelly et al. | 340/572.7 |
| 6,106,020 | A | * | 8/2000 | Leef et al. | 283/67 |
| 6,111,953 | A | * | 8/2000 | Walker et al. | 380/51 |
| 6,122,372 | A | * | 9/2000 | Hughes | 380/2 |
| 6,150,921 | A | * | 11/2000 | Werb et al. | 340/10.1 |
| 6,152,367 | A | * | 11/2000 | Kowalski | 235/382 |
| 6,226,619 | B1 | * | 5/2001 | Halperin et al. | |
| 6,405,315 | B1 | * | 6/2002 | Burns et al. | 713/190 |
| 6,434,238 | B1 | * | 8/2002 | Chaum et al. | 380/45 |
| 6,442,276 | B1 | * | 8/2002 | Doljack | 380/51 |
| 6,600,823 | B1 | * | 7/2003 | Hayosh | 380/51 |
| 6,746,053 | B1 | * | 6/2004 | Afzali-Ardakani et al. | 283/72 |
| 6,817,538 | B2 | * | 11/2004 | Afzali-Ardakani et al. | 235/494 |
| 2002/0143671 | A1 | * | 10/2002 | Afzali-Ardakani et al. | 705/28 |
| 2003/0141358 | A1 | * | 7/2003 | Hudson et al. | 235/375 |
| 2004/0112962 | A1 | * | 6/2004 | Farrall et al. | 235/462.01 |
| 2005/0038756 | A1 | * | 2/2005 | Nagel | 705/76 |

OTHER PUBLICATIONS

Edelstone et al., "Microchip technology . . . " by Prudential securities Inc., Nov. 1995.*

"Gemplus announces integration of GemSAFE with IBM Smart Card Security Kit", from Business Wire, p. 1323, Oct. 1998.*

"Gemplus to showcase Gem SAFE Smart Card security solutions at RSA conference" from Business Wire, p. 1418, Jul. 1997.*

Reid, Metrorail to take a high-tech trip wtih smart card, the Washington Post, Final Edition (DialogClassic Web (tm) database, file 146: Washington Post Online), Jul. 1998.*

Hall, Metro, First Union plan ATM fare card, Washington Business Journal, p19 (from DialogClassic Web (tm) , file 16), Sep. 1998.*

From DialogClassic Web (tm), file 16, Ramtron and Cubic produce improved mass transit smart card chip; innovative chip design to fuel wide usage of new fare collection technology, Business Wire, p7240020, Jul. 1998.*

From DialogClassic Web(tm) file 20, Ramtron FRAM chips used in Cubic smart fare cards, Newsbytes, Jul. 1998.*

MG Dinning, An abstract about "Smart cards: debunking the myths", Mass transit journal, vol. 23 issue No. 4. pp. 27-38, Aug. 1997.*

Reid, Fare-ATM cards set for test by metro officials approve project with bank, The Washington Post, (from DialogClassic Web(tm) file 146), Sep. 1998.*

Reid, Maintenance takes hit in metro spending plan general manager's budget would defer repairs, but he warns of problems down the road, (from DialogClassic Web(tm) file 146), Dec. 1997.*

From DialogClassic Web(tm) file 387, Briefing, Denver Post, FRI1 ED, P C-02, this article has a briefing about smart-card chips of Ramtron International Corp. on p. 2 of 3), Oct. 1997.*

From DialogClassic Web(tm) file 696, Items of Interest—Report on smart cards, BRP Publications, Sep. 1998.*

From DialogClassic Web(tm) file 696, Ramtron gets order from cubic to ship contactless smart cards chips, BRP Publications, vol. 11 issue 22, Nov. 1997.*

Slew, ATM-fare card to get spring test First Union paying for experiment with Metro passengers, the Washington Times, p. A8, Jul. 1998.*

Troshinsky, GE captial & GEMPLUS announce North American partnership,Report on Smart Cards Newsletter, Apr. 28, 1997, vol. 11 issue 8 (DialogClassic Web(tm) file 696).*

DialogClassic Web(TM) file 816, Leading Smart Card manufacturers announce formation of Java card forum, Canada Newswire, Feb. 12, 1997.*

DialogClassic Web(TM) file 319, The abstract of The battle against counterfeiting. from Parfums, Cosmetiques, Aromes. n.80 p. 30, May 1, 1988.*

DialogClassic Web(TM) file 167, Counterfeit goods samples provided to mark holder by Customs should be unaltered—CTFA, The Rose Seheet, Nov. 15, 1993, vol. 14 Issue 46.*

Slomski, the abstract of "Liquor marketing: Importers see red over gray market", Advertising Age, v57n40, p. S19, Jul. 21, 1986.*

DialogClassic Web(TM) file 9, Parallel lines, SPC Asia Journal, n 3, p 21, Feb. 1997.*

DialogClassic Web(TM) file 9, International company news: ICL targets Net copyright theft, Financial Times London Edition, p 23, Oct. 12, 1995.*

DialogClassic Web(TM) file 20, Market witnesses some upheavals, Gemini—Nation (Pakistan), Nov. 2, 1998.*

DialogClassic Web(TM) file 660, Hearing of the courts and intellectual property subcommittee of the house judiciary committee about trademark protection, Washinton dateline general news, Oct. 21, 1999.*

DialogClassic Web(TM) file 748, Get ready for the jobs of tomorrow, Asiaweek Journal, Aug. 20, 1999.*

DialogClassic Web(TM) file 9, D&G taking a bite out of bogus goods (Dolce & Gabbana clamps down on counterfeiters with project that features invisible codes, holograms and identification kits for border police), Women's Wear Daily Journal, v174 n108, p. 24.*

DialogClassic Web(TM) file 9, Smart Card missionary Gemplus now just wants to do business, Computergram International Newsletter, n 3176, Jun. 6, 1997.*

"Central Trust/P&G card links shopper purchases", Bank Marketing Manazine, Sep. 1988, p. 51, 1 sheet.*

"Trying to get smart", Retail Automation, May/Jun. 1989, pp. 9-10.*

"Instant coupons on video screenset for test run at Finast checkouts", Plain Dealer, Cleveland, Ohio, Nov. 18, 1998, p. B15, 1 sheet.*

* cited by examiner

| | |
|---|---|
| CARMEN-BIZET-XTAER12<br>AE34MNV56PIL87LOK56<br>WER56IOL109PYT-NJHG8<br>19837547542797874<br>GREEN-CIRCULAR-15OZ | COMPLETE SERIAL NUMBER |
| CARMEN-BIZET- | PRODUCT IDENTIFIER |
| XTAER12 | MANUFACTURING INFORMATION* |
| AE34MNV56PIL87LOK56<br>WER56IOL109PYT-NJHG8 | ROUTING INFORMATION* |
| 19837547542797874 | PURE SERIAL NUMBER |
| GREEN-CIRCULAR-15OZ | OTHER PRODUCT INFORMATION |

SAMPLE SERIAL NUMBER STRUCTURE: THE * ITEMS CAN BE UNDERSTANDABLE OR NOT BY THE CUSTOMER

FIG.2

SYSTEM FOR PROTECTION OF GOODS AGAINST COUNTERFEITING

CROSS-REFERENCE TO RELATED APPLICATIONS

This application is a continuation-in-part (CIP) of application Ser. No. 09/060,026, filed Apr. 14, 1998, now U.S. Pat. No. 6,069,955, issued May 30, 2000. This application is related to application Ser. No. 09/182,269 filed Oct. 29, 1998 by A. Halperin et al entitled "Method and System for Preventing Counterfeiting of High Price Wholesale and Retail Items"; and to application Ser. No. 09/182,280 filed Oct. 29, 1998 by A. Afzali-Ardakani et al entitled "Method and System for Preventing Parallel Marketing of Wholesale and Retail Items"; which related Applications are being filed contemporaneously with this application. The entire disclosure of each of these applications is incorporated by reference herein. Each of these three application is copending and commonly assigned.

BACKGROUND OF THE INVENTION

1. Field of the Invention

The present invention generally relates to distinguishing authentic goods from counterfeit goods and, more particularly, to a system for authenticating consumer goods using an electronically authenticatable device attached to goods.

2. Description of the Related Art

Counterfeit or "knock-off" goods costs billions of dollars yearly to companies around the world in lost sales. Many counterfeited products are of inferior quality and therefore may tarnish the reputations of legitimate producers when consumers mistake the counterfeit for the real thing. Even if a counterfeit good is well done, the counterfeiter has avoided any of the expenditures in the research and development or intellectual property concerns incurred by or owed to the legitimate producer. Consumers and producers both suffer from counterfeiting through increased prices for legitimate merchandise and inferior quality of fraudulent merchandise.

Complete prevention against counterfeiting is probably unrealistic, at least for products which are manufactured. Some types of counterfeiting, often of inferior quality, are embraced by some consumers who desire to own, but cannot afford, expensive goods. Also, for products which are easily duplicable with no or little quality loss, some consumers prefer to protect their immediate financial interest rather than the interest of the legitimate producers.

Nevertheless, whether it be for the sake of honesty or because of quality concerns many, if not most, consumers prefer to purchase only authentic merchandise, especially when full price was paid. For these consumers, it is desired to provide a system by which the authenticity of a product can be confirmed to insure that what is being paid for is in fact the real thing.

It has been widely recognized by management of corporations most exposed to counterfeiting, such as, for example, manufacturers of compact disks (CDs), videos, perfumes, luxury watches, etc., that allowing the public to verify the authenticity of a product with a high degree of certainty would substantially help to mitigate damages incurred from counterfeiters.

Many ingenious anti-counterfeit schemes have been devised over the years. A typical example of a system widely used to identify a counterfeit good involves the use of seals which have traditionally been used to authenticate documents. Variations on this theme include watermarks, such as are found on some international currencies, fine prints, tiny objects attached to a product or the package such as holograms, and so on. The efficacy of such methods has dramatically decreased with the evolution of technology. Due to progress in various technologies, if the customer can recognize the "seal", the counterfeiter usually can imitate it in such a way that the customer cannot detect the difference. For example, holographic seals verifiable by a consumer, once difficult and expensive to reproduce, are now child's play with relatively inexpensive equipment.

On the other hand, it is easy to produce seals only verifiable by the vendor. However, the cooperation of the consuming public to contact the vendor to verify the seal is a drawback. To partially overcome this difficulty, several manufacturers attach a serial number to each item. It has been proposed to improve on this method in U.S. Pat. No. 4,463,250 to McNeight et al. and in U.S. Pat. No. 5,367,148 Storch et al. For serial numbers to offer increased protection, these patents propose to use a serial number where part or all of the digits are chosen at random or generated by some secret code. The originator keeps a copy of all numbers so generated and the check of authenticity is performed by verifying that the tag of a given item carries a number on the list. Such methods also propose some partial check using a small computer. Unfortunately, these methods suffer from several drawbacks. First, the need to contact the originator is unavoidable in the prior art. In such case, a counterfeiter may saturate the communication lines used for verification and make the process inefficient. Further, the fact that a database has to be kept of all purchases creates invasion of privacy issues for consumers. For example, if the consumer pays using a credit card, it becomes easy to attach the consumer's name to the product which has been bought, often without the consent of the consumer. Moreover, the originator must keep an ever growing database and must make this database quite secure for an unforeseen amount of time. Every access to the database must be secure, and one has to make certain that no external party obtains access to the database. This of course becomes increasingly difficult the larger and more often the data base is accessed. Secondly, using a small scanner, and the help of several accomplices, a would be counterfeiter may copy huge lists of existing serial numbers if the serial numbers are visible when the product is packaged, and the public has no means by which to even partially authenticate the product prior to purchase if the serial numbers are hidden. This problem is partially due to the fact that there is not very much connection between the serial number and the product it corresponds to, i.e. the serial number does not contain enough information about the product.

Another serious problem related to counterfeiting involves so called "parallel markets". There are two typical scenarios. In the first, stolen new goods can be reintroduced in various markets as genuine new goods, this is commonly referred to as the "black market". In the second, sometimes referred to as the "grey market", a producer sells on different markets having different pricing policies. An agent in a lower priced market may resell the producer's goods to an agent in a higher priced market. In both cases, the producer loses.

SUMMARY OF THE INVENTION

It is therefore an object of the present invention to help protect legitimate vendors and the public against difficult to recognize counterfeits.

It is yet another object of the present invention to aid law enforcement authorities in the pursuit of counterfeiters and identifying illegal counterfeit goods as well as goods being sold in parallel markets.

It is yet another object of the present invention to provide a system for authenticating goods by using tamper-resistant and/or duplication-resistant electronic "tags" such as smart cards attached to goods.

According to the invention a smart tag attached to the goods contains encrypted authentication information, such as a serial number, and can further contain encrypted identifying information associated with the goods such as, for example, a description of the good's physical appearance or chemical decomposition, its color, its routing information, etc. The encryption procedure comprises public/private key encryption with zero-knowledge protocols. Zero knowledge protocols allow a smart tag to be authenticatable and yet be duplication resistant by allowing the verifying agent to convince him/herself that the smart tag is authentic without revealing its authentication information.

The verification procedure can be done using a contact or contactless card reader equipped with the appropriate public key and zero-knowledge protocols to decrypt the identifying information. A printed version of the serial number or other authentication information may be placed on the goods in human readable form to quickly verify the information electronically read from the smart tag. With the present invention, only the manufacturer can create such smart tags with the associated data thus making it virtually impossible to pass off a counterfeit good as authentic.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a sample of a possible serial number structure according to the present invention;

DETAILED DESCRIPTION OF A PREFERRED EMBODIMENT OF THE INVENTION

Figure 1:
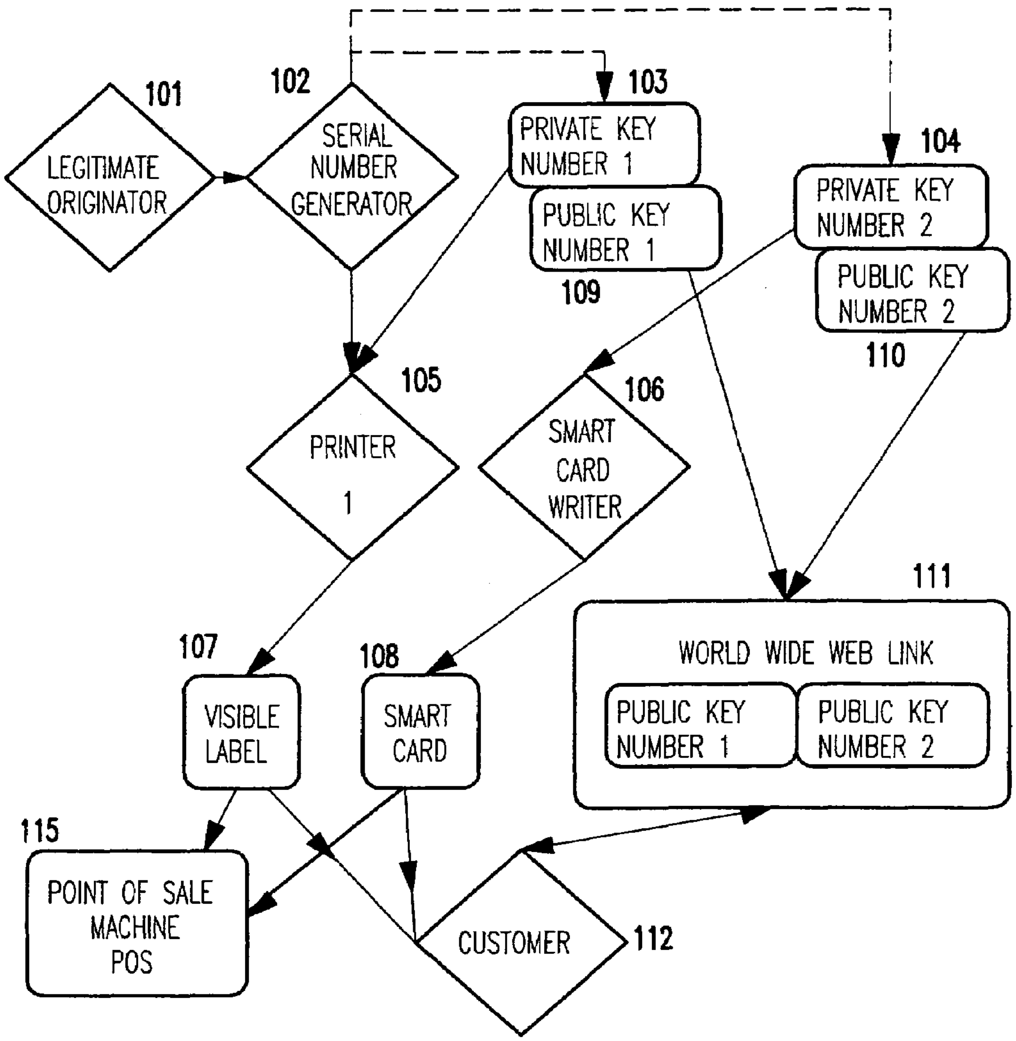
FIG. 1 is a block diagram of a first embodiment of the present invention.

Referring now to the drawings, and more particularly to FIG. 1 there is shown a block diagram of a first embodiment of the present invention. A legitimate manufacturer 101 commands a serial number generator 102 to generate sequences of serial numbers. These serial numbers can be just consecutive numbers, or contain uncoded and/or coded information as exemplified in FIG. 2. The legitimate manufacturer 101 also possesses private keys, 103 and 104, and the corresponding public keys, 109 and 110, from private key/public key pairs as available now in many forms.

Public key encryption involves the use of private/public key pairs. The private key is known only to the manufacturer. Using a corresponding public key provided by the manufacturer, the consumer or law enforcement agent can verify that the encrypted version matches the serial number. An advantage to this method is that only the manufacturer can produce matching pairs. The wide spread availability of the public key does not compromise the security of the private key. The public key for verification can be made available on the product itself or by the manufacturer for example over the Internet. A comprehensive description on the subject of private/public key pairs and zero-knowledge protocols can be found in "Handbook of Applied Cryptography", Alfred Menezes et al., CRC Press, 1997, and in "Cryptography: theory and practice", D. R. Stinson, CRC Press, 1995, herein incorporated by reference.

Zero knowledge protocols may be used to allow a smart tags to be authenticatable and yet be duplication resistant by allowing the verifying agent to convince him/herself that the smart tag is authentic without the smart tag revealing its authentication information. Such zero knowledge protocols have been disclosed for instance in U.S. Pat. No. 5,140,634 to Guillou et al., U.S. Pat. No. 4,864,110 to Guillou, and U.S. Pat. No. 4,995,082 to Schnorr, all herein incorporated by reference.

Referring still to FIG. 1, the serial number generated by generator 102 is encrypted using the private keys 103 and 104. The serial number and its encrypted version from 103 are communicated to printer-1 at block 105, while the encrypted versions from private key 104 is communicated to smart card writer at block 106. Printer 1 at block 105 prints a visible label 107 and the smart card writer at block 106 produces a smart card 108 containing the coded information prepared at 104. The visible label is attached to the product, while the smart card 108 is either attached to the product or simply packaged with the product. The legitimate manufacturer 101 make the public keys, 109 and 110, accessible to the customer or law enforcement agents 112, for instance through a link of the Internet World Wide Web (WWW) 111. The customer can verify authenticity in a first stage by examining the visible label using public key 109 or verification can be performed by the customer after the purchase by examining the hidden label using public key 110. The cashier may verify the authenticity of the product from the visible label in front of the customer with a point of sale (POS) machine 115 such as a cash register equipped with the appropriate public key and, if desired, a smart card reader.

The protection coming from the smart card containing the serial number and the private key/public key pair 104 and 110 can be omitted if the customer is satisfied with the level of authenticity verification provided by the visible label. Similarly, specific agents may only be interested verifying the smart card in which case the label can be omitted. Using the link to the WWW 111, or some other link to the legitimate originator, the customer may be able to register the serial number of the product that has been purchased. After the customer initiates such initial contact, the manufacturer can contact the customer for example to relay product update information, recall information, etc.

Figure 3:
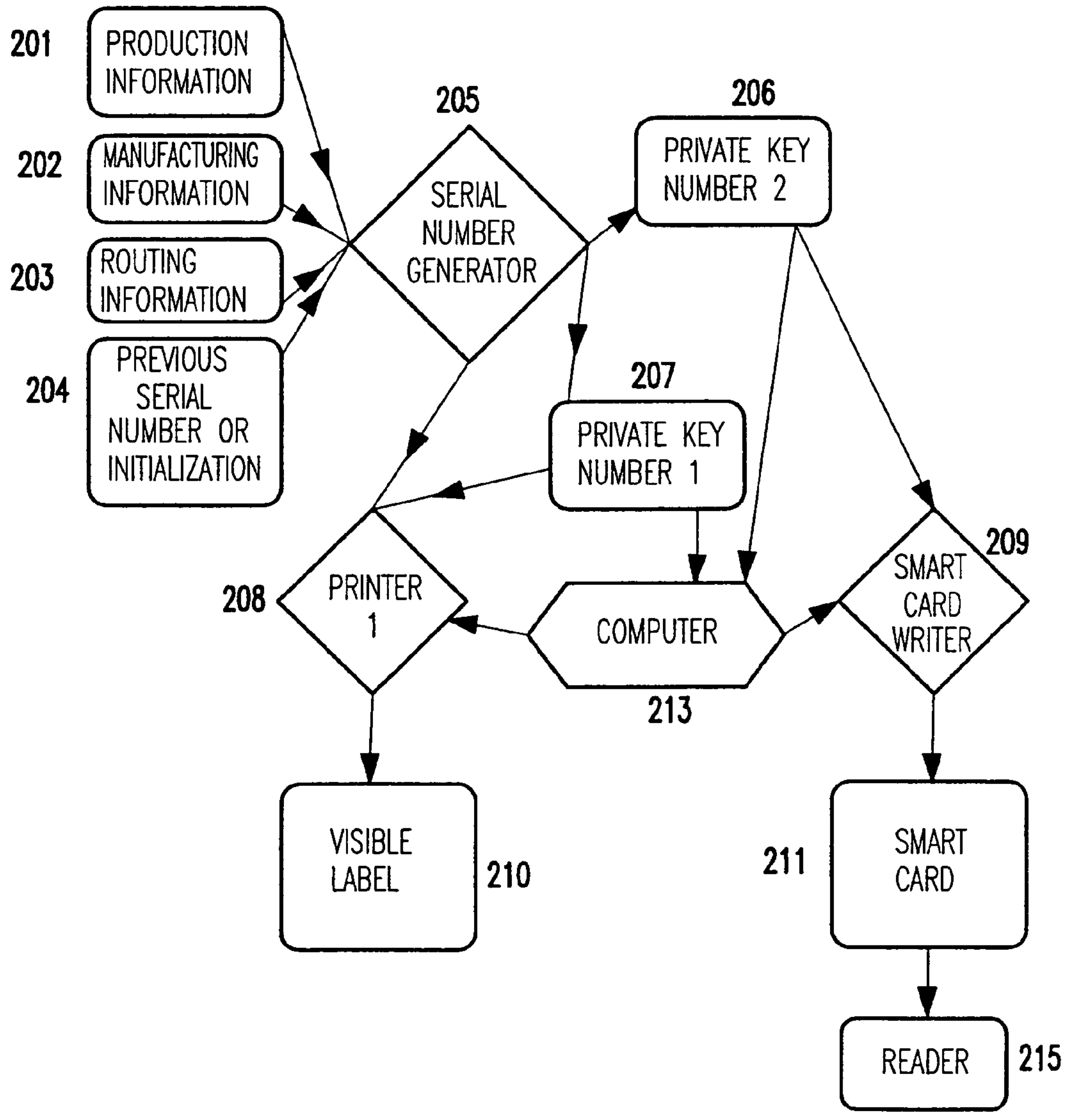
FIG. 3 is a block diagram of a second embodiment of the present invention.

The label and smart card composition and data can be further detailed as follows for a series of serial numbers with reference now to FIG. 3. The product information 201, manufacturing information 202, routing information 203, and the previous serial number in the series (or some initialization number at first stage) 204 are sent to the serial number generator 205. The serial number is sent to private key number-2 at block 206. The encrypted versions of the serial number is sent to the smart card writer at block 209 which writes it on the smart card 211. The serial number is also sent by the serial number generator 205 to printer-1 at block 208, possibly in conjunction with an encrypted version of it, encrypted using private key number 1 at block 207. What is received at printer-1 208 is printed on the visible label 210. Controls are be made, using the public keys corresponding to private key-1, and if needed private key-2, to verify that the label and the smart card 211 correspond to each other and, when private key-1 is used, that the readable and encoded versions of the serial number match on the visible label. Private key-1 (207) can be replaced by some apparatus generating a watermark or other alteration of the product which do not affect its quality in a human-perceptible way.

The visible label will be printed by a printer linked to a computer 213. A part of the serial numbers is composed in successive sequences incremented by one. A part of the serial number will preferably contain information such as routing, product name, date, etc. Each serial number is processed by two private key encoders, yielding two numerical identifiers. One of the numerical identifiers is written to the smart card while the serial number and the second identifier are printed on the label, which will later be glued directly to the product or its packaging so as to be visible from the outside. The printing chain is also equipped with a verifier device (not shown) which checks that the various sets of numbers are printed in a synchronous way. The second numerical identifier allows a preliminary check of authenticity, which should enable easy identification of the more flagrant counterfeit product labeling.

Instead of a serial number, the numerical identifier could include a description of the physical appearance of the product, the color of the product, a chemical decomposition of the product and other descriptions of the product, including digital images of the product. This information will be contained in block 201 (FIG. 3). Furthermore, the identifier could also be encoded in various forms of widely used barcodes.

A smart tag may be a smart card 211 or any other electronic device which contains memory and/or processing and computation circuitry and can operate autonomously and responds to queries from a verifying or authentication device. A more detailed discussion to smart card technology and applications can be found in "Smart Cards: a guide to building and managing smart card applications," by Henry Dreifus and J. Thomas Monk, John Wiley & Sons, 1998, herein incorporated by reference.

In case zero-knowledge protocols are used the smart card 211 is tamper resistant and/or duplication-resistant. For certain applications, the smart card 211 may be programmed to self-destruct (i.e., erases its contents) after verification in which case the use of a visible label may be dispensed with. Alternatively, it could be kept and maintained as a title and record of the whole resale history of the product to which it is attached. Depending on applications, the smart card can contain only authentication information showing that the attached goods came from the purported manufacturer. For instance, the smart card can contain authentication information about the manufacturer, not the particular goods themselves, in which case the smart card is the same for all products by the manufacturer. In other applications, the smart card can further contain specific encrypted information about the attached goods, such as digital images of the goods, a physical or chemical description of the goods, unique serial numbers, etc. The verification procedure can be done using a card reader 215 equipped with the appropriate public key and zero-knowledge protocols to decrypt the identifying information. The card reader 215 may be required to make contact with the card 211 or, in certain applications where the card 211 is embedded in the goods, inductive, capacitive or some other type of contactless coupling may be employed by the reader to read the card 211.

Figure 4:
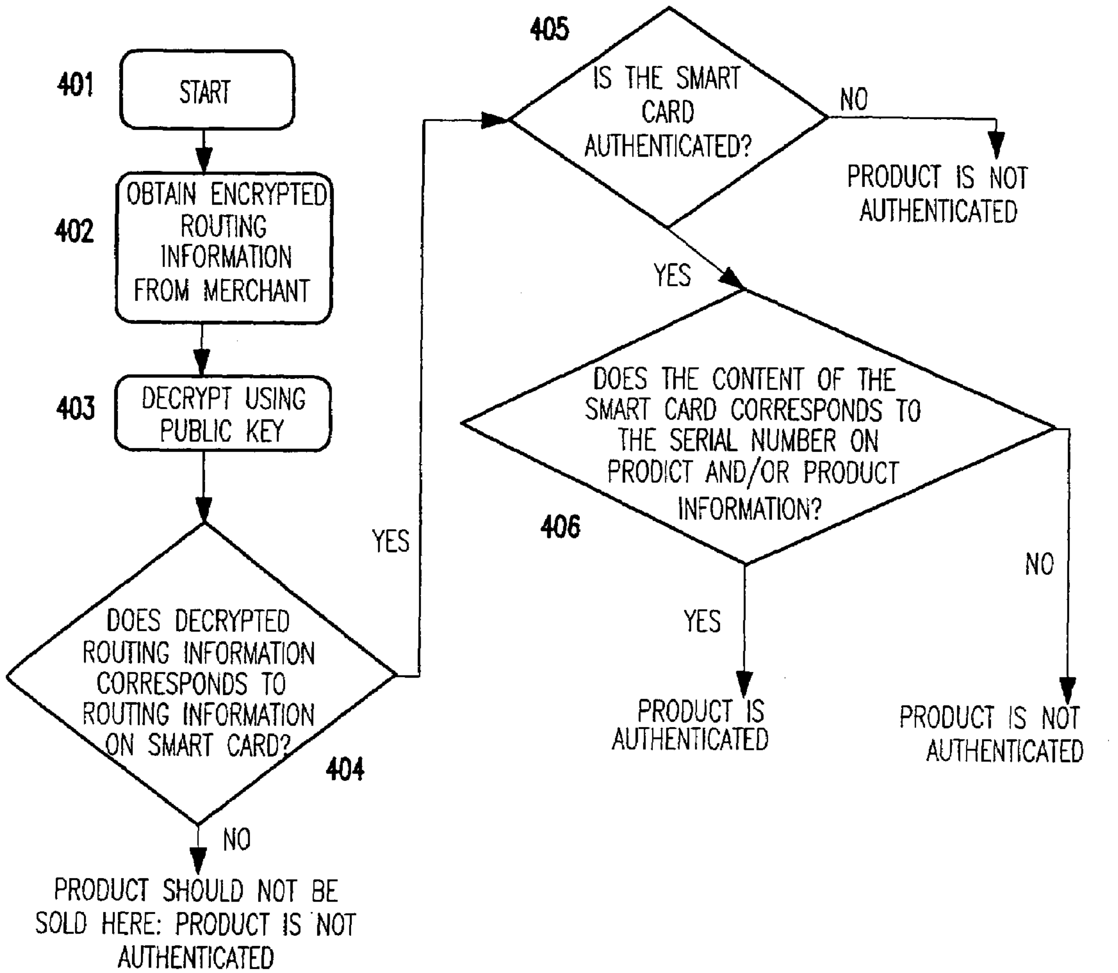
FIG. 4 is a block diagram of an embodiment of the invention for identifying parallel markets.

Referring to FIG. 4, this invention can be used to prevent parallel markets from occurring by encoding routing information into the serial number or in the coded version of it. At the point of sale, the customer can ask to authenticate the product, and this verification can only be done if the routing information is kept intact, and is compatible with the actual point of sale. The smart card reader which performs this authentication is designed to only function in such circumstances. For example, the manufacturer give each merchant the routing information encrypted with a private key and the smart card reader can only authenticate the product if decrypting the encrypted routing information with a corresponding public key results in a match with the routing information on the product. In block 402, the smart card reader obtains the encrypted routing information from the merchant and decrypt it using a corresponding public key (403). In decision block 404 the decrypted routing information is compared with the routing information in the smart card. If they do not match, the product is not meant to be sold here and the authentication fails. If they do match, in decision block 405 the smart card is authenticated. If the smart card is not authenticated, the product fails to be authenticated. If the smart card is authenticated, in decision block 406, the product information in the smart card is compared with the serial number and/or other types of product information. If they do not match, the product is not authenticated. If they do match, the product is authenticated. As an additional incentive for the customer to perform such verification, one can decide that the warranty on a product can only be activated if the product can be authenticated in this way at the point of sale. Upon activation, the customer can choose to obtain a printed version of the warranty. If desired, the merchant can write onto a special memory section of the smart card the date and other information of the purchase.

While the invention has been described in terms of a preferred embodiment, those skilled in the art will recognize that the invention can be practiced with modification within the spirit and scope of the appended claims.

We claim:

1. A system for verifying authenticity of a product, comprising:

an electronic tag attached to or embedded in one of said product and product packaging, said electronic tag comprising a memory storing authentication information for said product;

a reader for reading said authentication information from said electronic tag to verify that said product is authentic; and a label attached to or printed on one of said product and product packaging having printed authentication information thereon to be verified against the authentication information stored in said memory of said electronic tag which is read by said reader;

wherein said authentication information in said memory of said electronic tag is encrypted using a private key and said reader decrypts said information using a corresponding public key, and wherein a zero-knowledge protocol is used to make said authentication information resistant to duplication, whereby authenticity of said product achieved by a comparison of said authentication information read by said reader and said printed authentication information on said label.

2. A system for verifying the authenticity of a manufactured product as recited in claim 1 wherein said electronic tag is a smart card.

3. A system for verifying, the authenticity of a manufactured product as recited in claim 1 wherein said electronic tag is embedded into one of said product and product packaging product.

4. A system for verifying the authenticity of a manufactured product as recited in claim 1 wherein said authentication information further comprises information for authenticating said electronic tag.

5. A system for verifying the authenticity of a manufactured product as recited in claim 1 further comprising a point of sale machine, said reader being contained in or connected to said point of sale machine.

6. A system for verifying the authenticity of a manufactured product as recited in claim 1 wherein said reader comprises means for reading said electronic tag without physically contacting said electronic tag.

7. A system for verifying the authenticity of a manufactured product as recited in claim 1 wherein said authentication information is specific to the product.

8. A system for verifying the authenticity of a manufactured product as recited in claim 1 wherein said authentication information is directed to a manufacturer of the product.

9. A system for verifying the authenticity of a manufactured product as recited in claim 7 wherein said authentication information comprises an ownership history of the product.

10. A system for verifying the authenticity of a manufactured product as recited in claim 7 wherein said authentication information comprises a graphic image of the product.

11. A system for verifying the authenticity of a manufactured product as recited in claim 7 wherein said authentication information comprises one or more of product color, product shape, product serial number, product weight, product routing information, and product chemical composition.

12. A method for detecting products being sold in a parallel market, comprising the steps of:

generating encrypted authentication information for a product using a private key, and wherein a zero-knowledge protocol is used to make said encrypted authentication information resistant to duplication, said encrypted authentication information including routing information for the product;

storing said encrypted authentication information in a memory of an electronic tag;

attaching said electronic tag to or embedding said electronic tag in one of the product and product packaging;

reading said encrypted authentication information from said electronic tag, said reading step including decrypting said encrypted information using a public key corresponding to said private key; and verifying said routing information in said encrypted authentication information matches routing information at a point of sale to determine if said product is sold in a parallel market.

13. The method of claim 12, further comprising the step of attaching a label to or printing a label on one of said product and product packaging having printed authentication information thereon to be verified against the encrypted authentication information stored in said memory of said electronic tag, said printed authentication information including printed routing information.

14. A method for verifying the authenticity of a product, comprising the steps of:

generating encrypted authentication information for a product using a private key, and wherein a zero-knowledge protocol is used to make said encrypted authentication information resistant to duplication;

storing said encrypted authentication information in a memory of an electronic tag;

attaching said electronic tag to or embedding said electronic tag in one of said product and product packaging;

attaching a label to or printing a label on one of said product and product packaging having printed authentication information thereon to be verified against the encrypted authentication information stored in said memory of said electronic tag;

reading said encrypted authentication information from said electronic tag, said reading step including decrypting said encrypted authentication information using a public key corresponding to said private key; and verifying that said manufactured product is authentic where authenticity of said product is verified by a comparison of said encrypted authentication information stored in said electronic tag and said printed authentication information on said label.

15. A method for verifying the authenticity of a manufactured product as recited in claim 14 further comprising the step of erasing said authentication information from said electronic tag after reading.

16. A method for verifying the authenticity of a manufactured product as recited in claim 14 further comprising the step of recording an ownership history of said product in said electronic tag.

* * * * *